Figure 4:
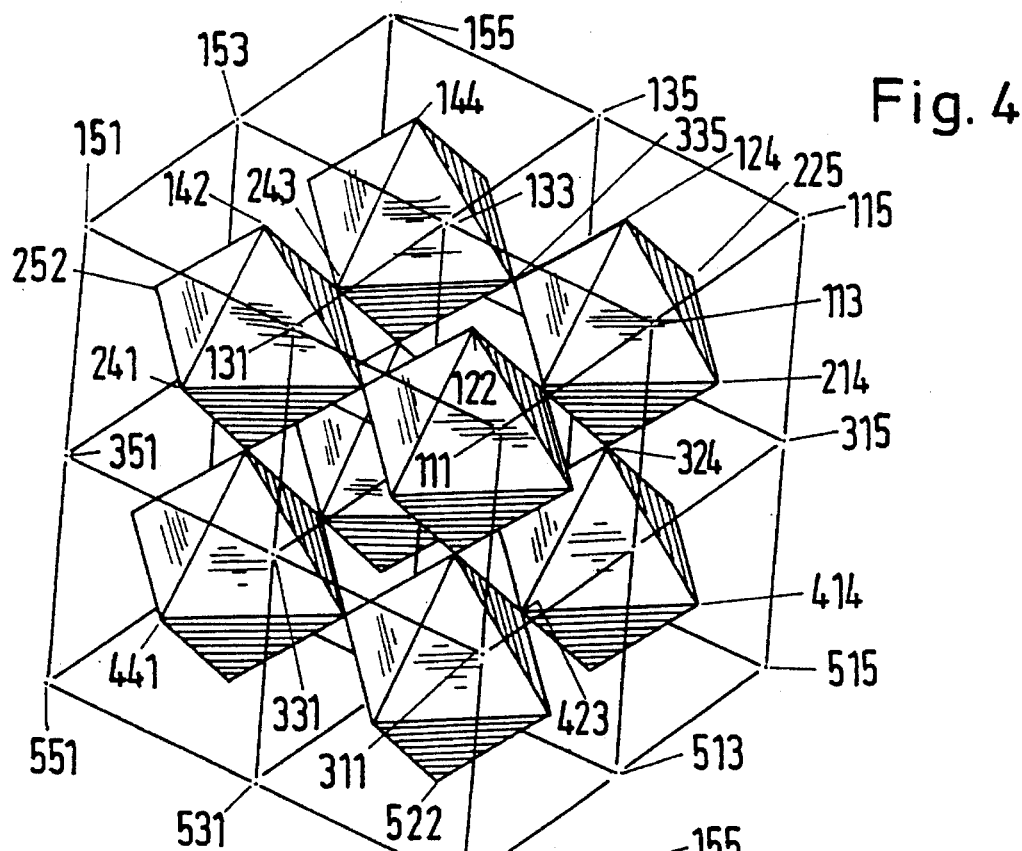

United States Patent [19]

Süess

[11] Patent Number: 5,500,160

[45] Date of Patent: Mar. 19, 1996

[54] VORTEX PACKING FOR MASS EXCHANGE COLUMNS AND STATIC MIXERS

[75] Inventor: Philipp Süess, Neftenbach, Switzerland

[73] Assignee: Sulzer Chemtech AG, Winterthur, Switzerland

[21] Appl. No.: 388,335

[22] Filed: Feb. 9, 1995

[51] Int. Cl.⁶ .................................................. B01F 3/04
[52] U.S. Cl. .................. 261/79.2; 261/94; 261/DIG. 72
[58] Field of Search ..................... 261/79.2, 94, DIG. 72

[56] References Cited

U.S. PATENT DOCUMENTS

| | | | |
|---|---|---|---|
| 4,107,241 | 8/1978 | Braun | 261/DIG. 72 |
| 4,490,310 | 12/1984 | Plaskura et al. | 261/94 |
| 4,600,544 | 7/1986 | Mix | 261/DIG. 72 |
| 4,830,792 | 5/1989 | Wilhelm | 261/79.2 |
| 5,158,712 | 10/1992 | Wilhelm | 261/79.2 |

FOREIGN PATENT DOCUMENTS 2406151  5/1979  France.

WO86/06296  11/1986  WIPO.
WO90/10497  9/1990  WIPO.

*Primary Examiner*—Tim R. Miles
*Attorney, Agent, or Firm*—Townsend and Townsend and Crew

[57] ABSTRACT

The vortex packing for an apparatus designed as a mass exchange column or a static mixer is build up of face-shaped structural elements. These structural elements define a point lattice whose lattice planes, situated in cross-sections of the apparatus, form base grids of quadrilaterals. Each of the quadrilaterals represents an equatorial periphery of an octahedron and the polar vertices of these octahedra are positioned at the points of neighbouring lattice planes. The octahedra have either all open faces or alternately open and closed faces. According to the invention the packing is built of parallel layers (3) of a sheet-like material having substantially triangular elementary areas (8,9). Part of these elementary triangles (9) have on two sides cut edges (30) and are deflected in a flap-like manner about folding edges (15) out of the sheet area. The structural elements of the packing are formed by association or connection of the elementary triangles (8,9) in pairs.

10 Claims, 6 Drawing Sheets

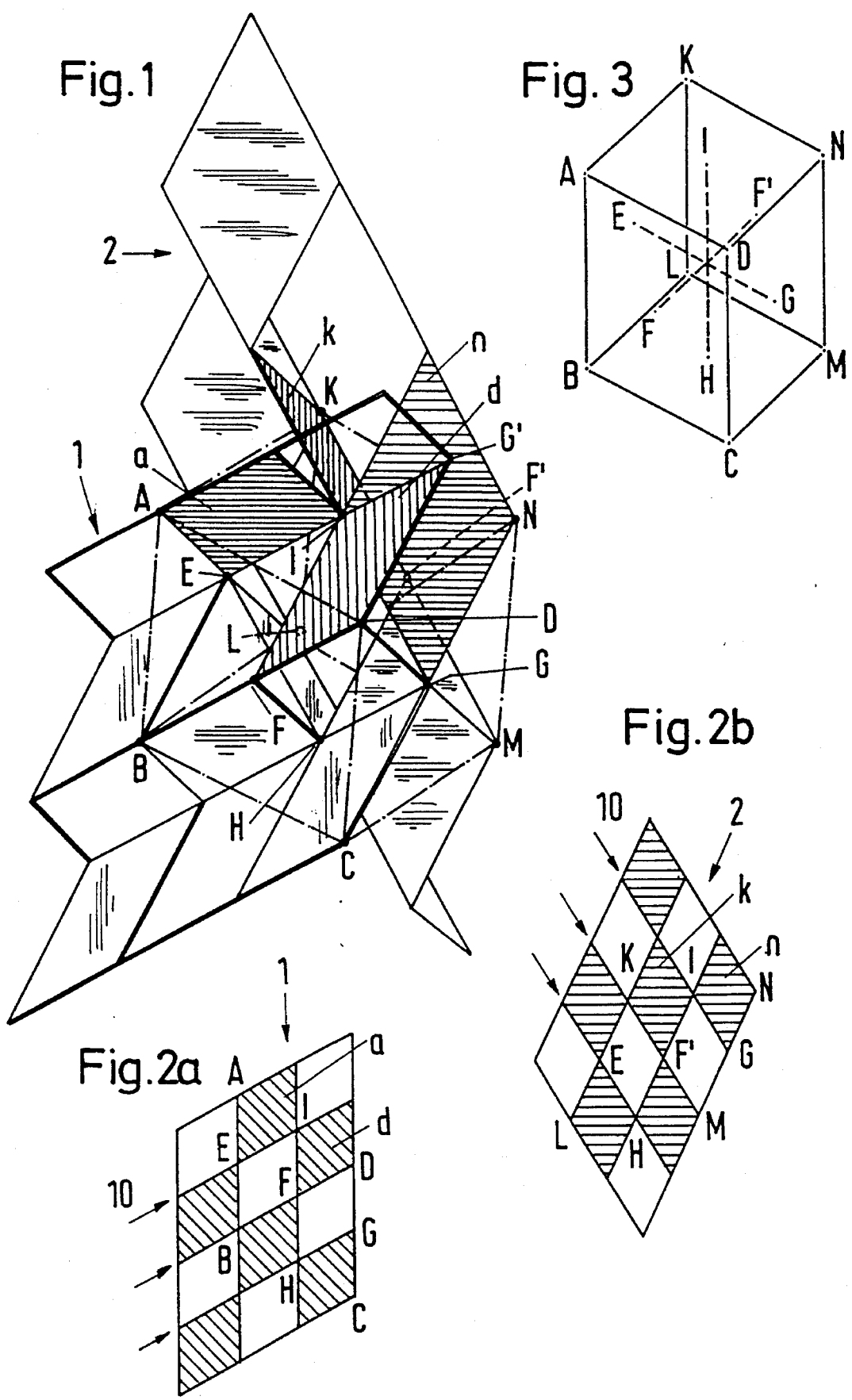

VORTEX PACKING FOR MASS EXCHANGE COLUMNS AND STATIC MIXERS

The invention relates to a vortex packing for an apparatus designed as a mass exchange column or a static mixer, according to the preamble of claim 1. The invention also relates to the use of such a vortex packing.

A vortex packing is an ordered packing with a fan-like arrangement of guiding surfaces which deflect the flowing media from their direction of main flow to all sides and mix together adjacent partial streams. The guiding surfaces are the structural elements of the packing. To the lattice planes, which are situated in the cross-sections of the apparatus, correspond two different layers of octahedra. In one of the layers the octahedra faces are alternately open and closed, while all the octahedra in the other layer have open faces. The layers are so interleaved that the octahedra of adjacent layers of the same kind meet at their polar vertices. The octahedra fill only two thirds of the space; the spaces between them consist of tetrahedra.

The totality of the layers with the octahedra which have alternately open and closed side faces, forms a partial system, for which the following applies: an octahedron is divided by the equatorial periphery situated in a cross-section of the apparatus into two pyramids, half of whose faces are open and half are closed. The closed faces meet only at the vertex (pole). Closed faces of pyramids above the base lattice of an apparatus cross-section never meet at a base face. Closed faces of two pyramids contacting each other at the vertices or poles do not extend in a common plane; on the other hand closed faces of two pyramids which are in contact with each other in the base line (=equatorial periphery) lie in a common plane and form thereby a planar quadrilateral face element.

Packing of the same kind is known from WO 90/10497 (=P.6332). This known packing may be built up of layers of zigzag folded metal sheets, so called pleated mats. The layers are parallel to the direction of the apparatus axis while the folding edges are inclined to the axis; the layers are alternately arranged such that they produce a system of channels which often cross each other. The unfolded metal sheets have a chess-board-like pattern with substantially rhombic fields, one half of which is made in the form of apertures. The other half of the fields forms the structural elements of the packing; they are connected together in the vertices by overlapping of the closed fields, so that the open fields of a somewhat smaller area are like insular openings. These openings provide in the packing a second system of channels which often cross each other; this system is perpendicular to the first system. The folding edges extend—in the direction of the overlapping—along a part of the field rims.

In the known packing the rhombic apertures are made, for instance, by stamping out of a sheet metal. As a consequence nearly half of the material is lost. The aim of the invention is to produce this known vortex packing with a loss of material which is as small as possible. This aim is achieved by the characterising features referred to in claim 1. This is achieved by suitable partial stamping out of the elementary areas, which are substantially triangular, and also by deflecting these elementary triangles about a folding edge, on the one hand to create the necessary apertures and on the other hand to form parts of the structural elements of the packing. By the totality of the elementary triangles which are deflected or left in the base area, it is possible to construct the known vortex structure without incurring any loss of material.

The dependent claims 2 to 7 relate to various embodiments of the vortex packing according to the invention. The independent claims 8 to 10 relate to their use.

Figure 5:
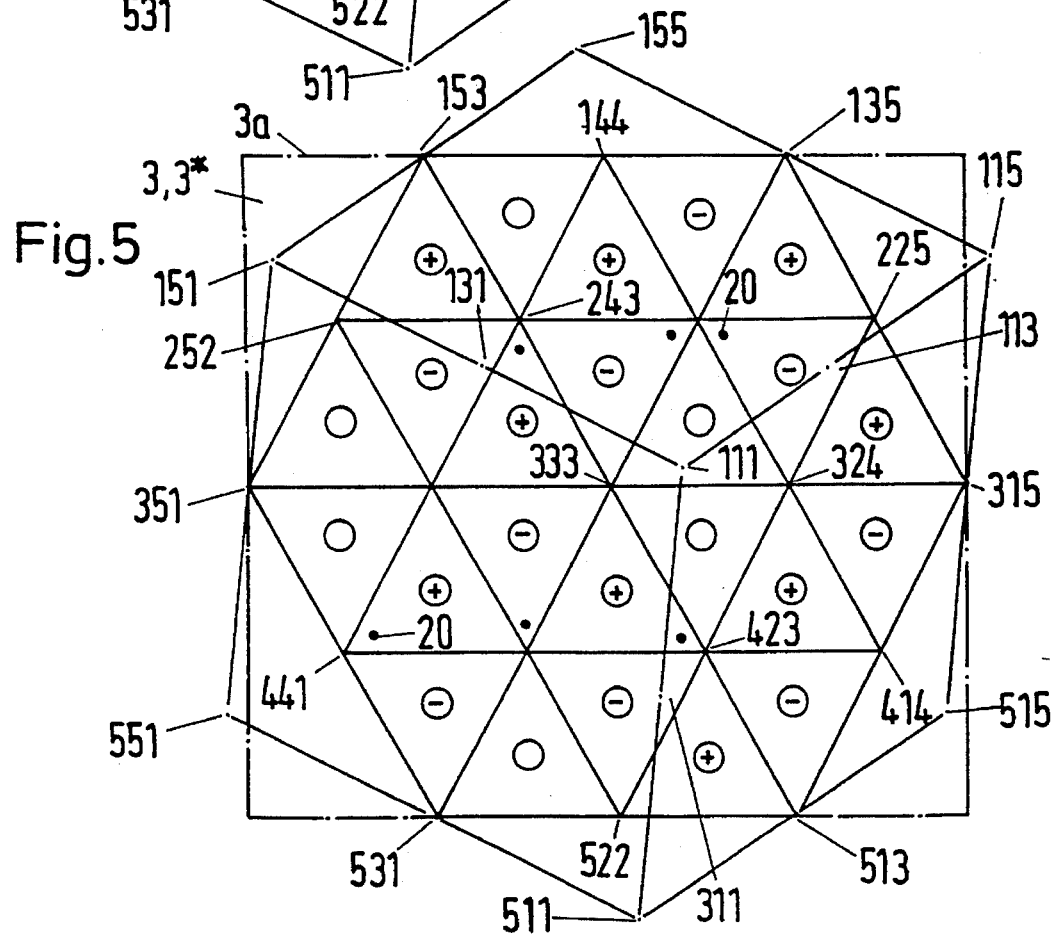
Figure 6:
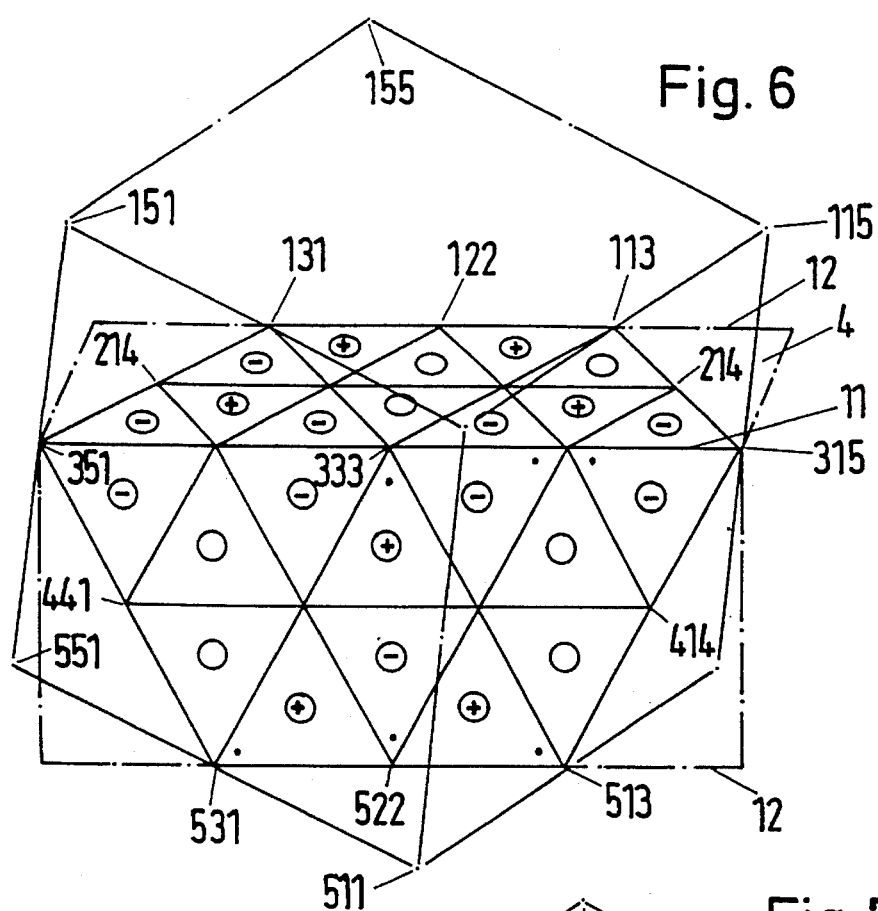
Figure 7:
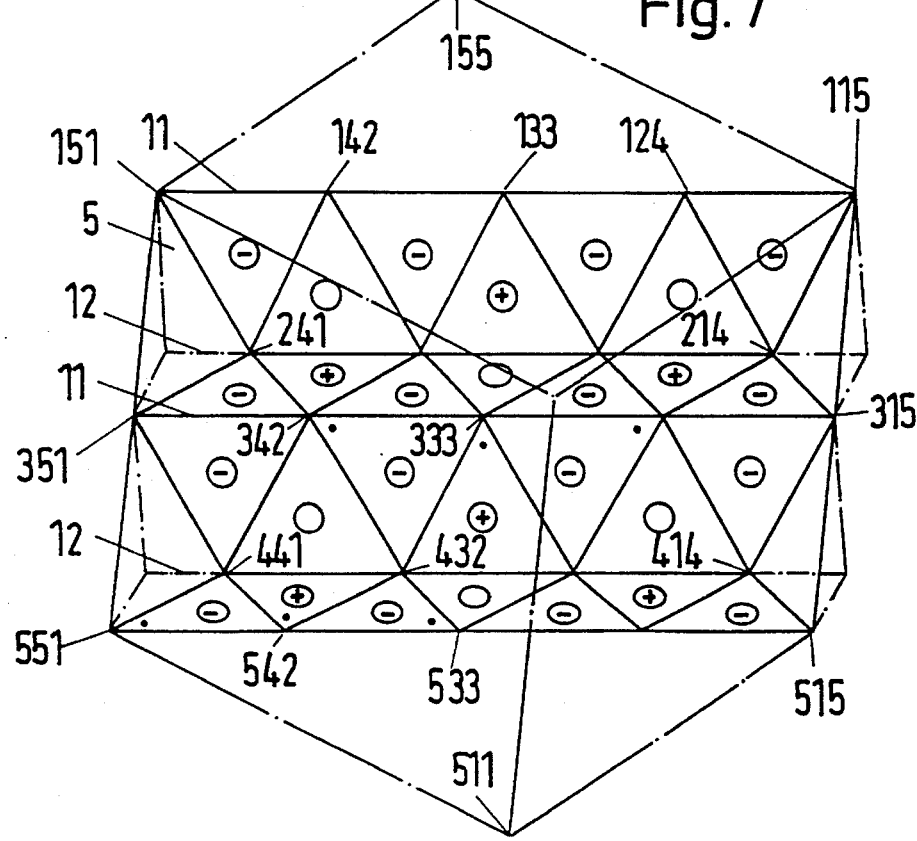
Figure 8:
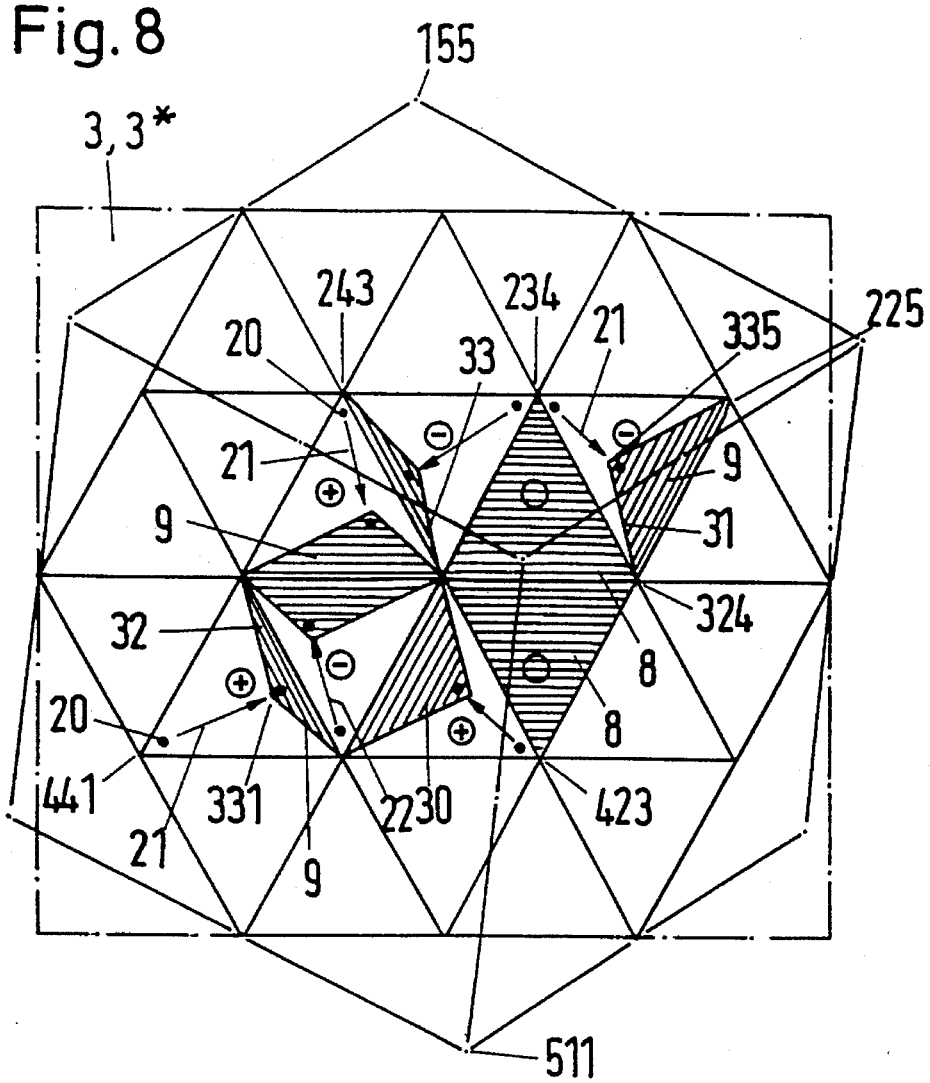
Figure 9:
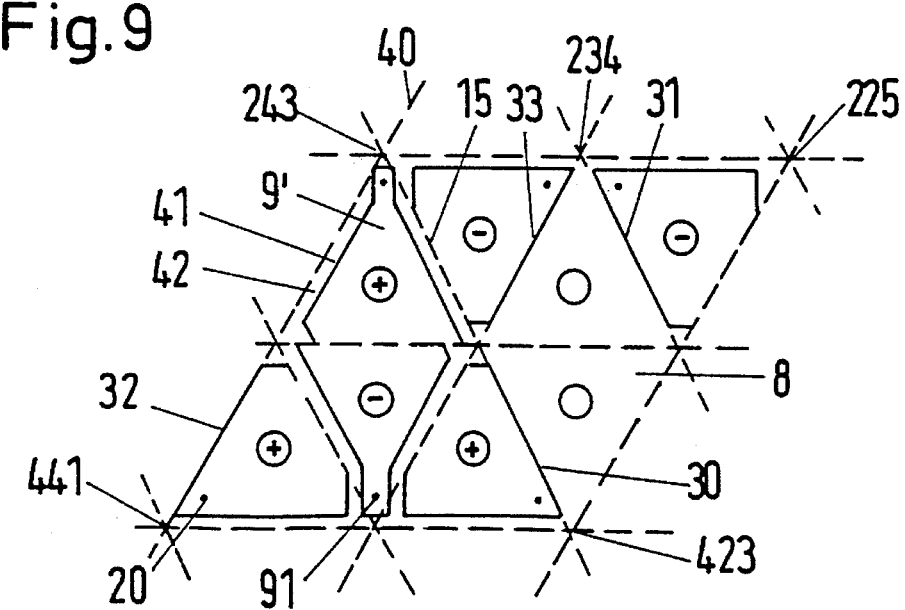
Figure 10:
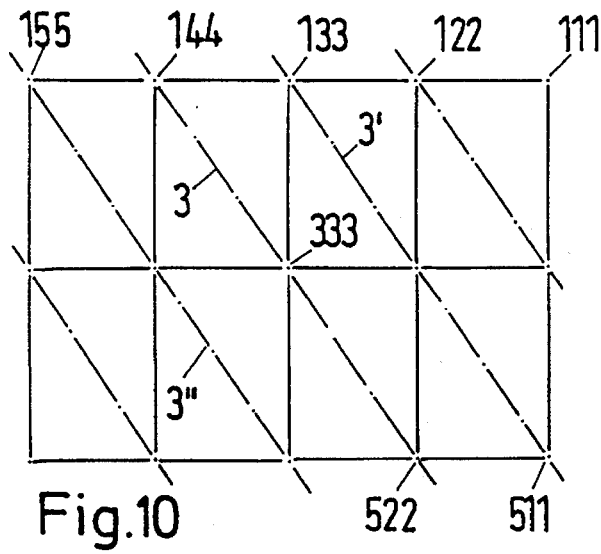
Figure 13:
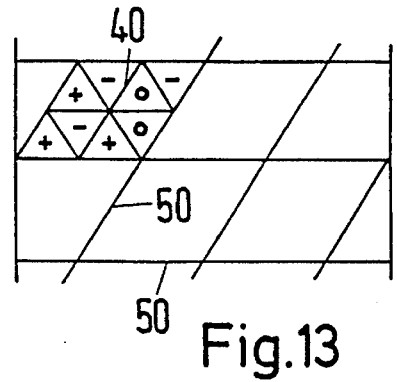
Figure 11:
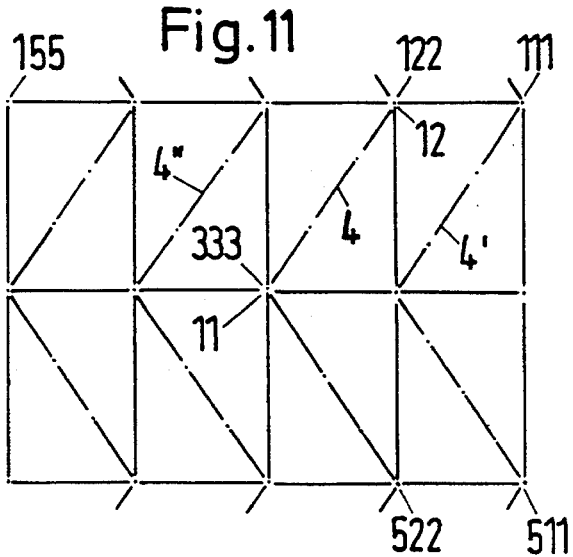
Figure 14:
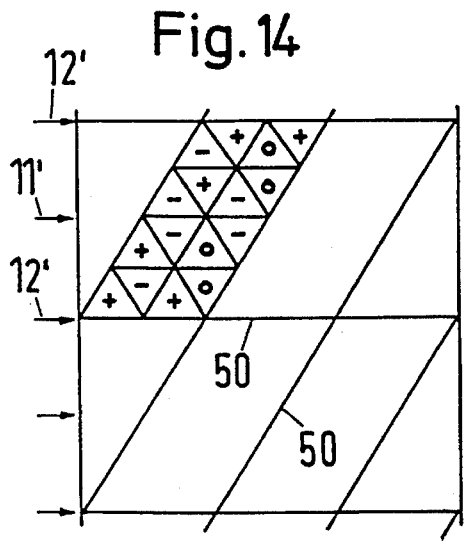
Figure 12:
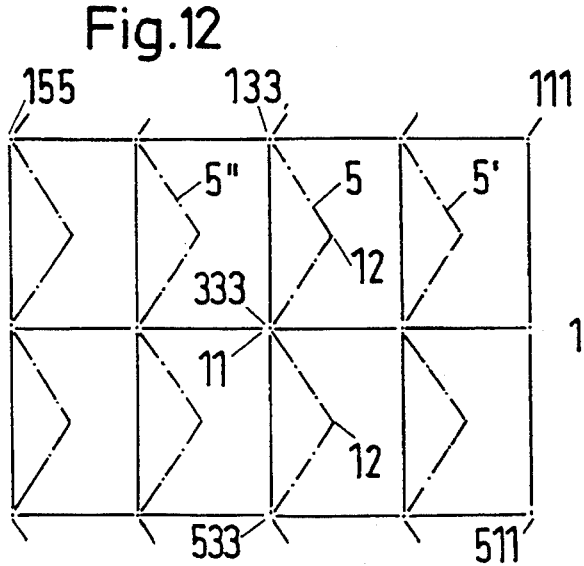
Figure 15:
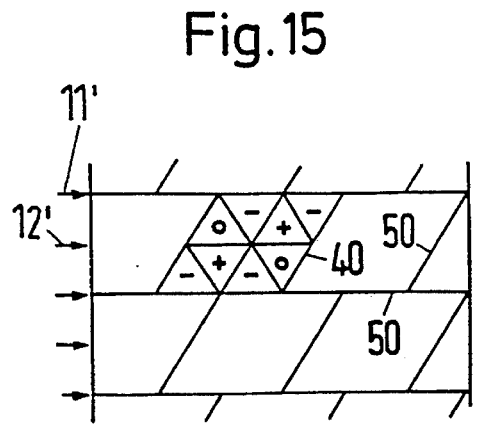
Figure 16:
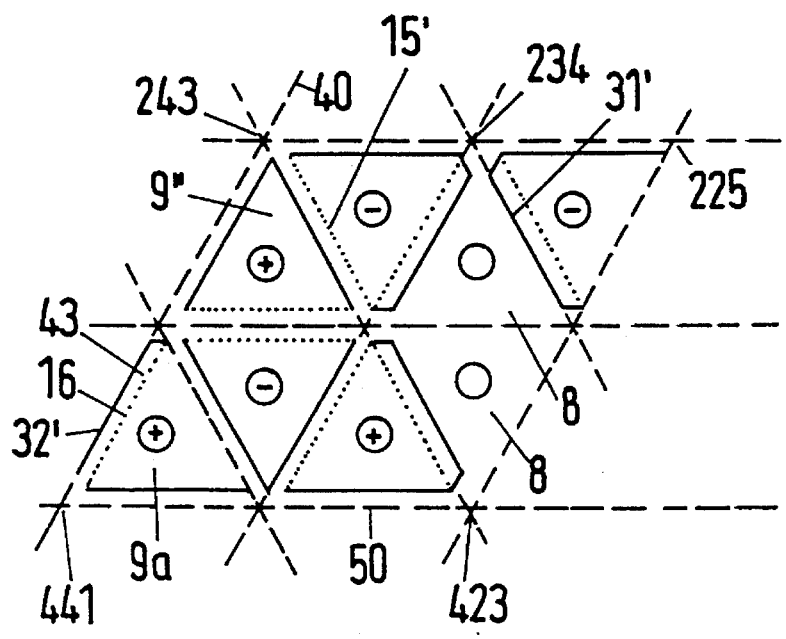
Figure 17:
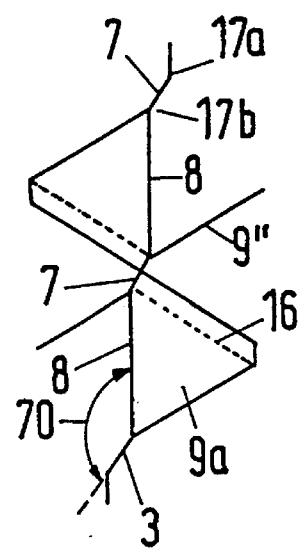

The invention will now be explained with reference to the drawings. In the drawings:

FIG. 1 is a cut-out of a known vortex packing,

FIGS. 2a,b, show two areas with rhombic fields which, after zigzag folding, result in the structure of FIG. 1, FIG. 3 is an elementary cell of a point lattice, FIG. 4 is an auxiliary Figure for the illustration of a face-centred cubic lattice, FIG. 5 is a cut-out of a base area of a vortex packing according to the invention for a first embodiment, FIG. 6 is cut-out, corresponding to FIG. 5, for a second embodiment, FIG. 7 is a cut-out, corresponding to FIG. 5, for a third embodiment, FIG. 8 is a cut-out of FIG. 5 with deflected elementary triangles, FIG. 9 shows an embodiment of deflectable elementary triangles, FIG. 10 is a longitudinal section through the vortex packing according to the invention (first embodiment) in which only the position of the base areas is shown, FIG. 11 shows a longitudinal section, corresponding to FIG. 10, for the second embodiment, FIG. 12 shows a longitudinal section, corresponding to FIG. 10, for the third embodiment, FIG. 13 is a pattern of the arrangement of the elementary triangles for the first embodiment, FIG. 14 is a pattern of the arrangement of the elementary triangles for the second embodiment, FIG. 15 is a pattern of the arrangement of the elementary triangles for the third embodiment, FIG. 16 shows elementary triangles of a variant of the first embodiment, and FIG. 17 is a cross-section through the base area of this variant.

In the special case where the structural elements are rhombi with an acute angle of 60°, the point lattice associated with the vortex packing of the same kind is a face-centred cubic lattice. This is shown in FIG. 1: the unit cell of the lattice is a cube with vertices A,B,C,D,K,L,M and N, and with face centres E,F,G,H,I and F' (see also FIG. 3 with a cube elongated in the direction A–B). The illustrated cut-out of the packing is composed of two zigzag folded areas 1 and 2 which are provided with rhombic apertures and which are illustrated in FIGS. 2a and 2b in their unfolded state. The areas illustrated by hatching (for instance a and d) are the closed areas; the remaining areas represent the apertures. The arrows 10 indicate the direction and position of the folding edges. As has already been mentioned, for practical carrying out of the structure shown in FIG. 1, it is necessary to connect the closed rhombic areas at their vertices by overlapping (see FIG. 4 of WO 90/10497). For the sake of simplicity here, and also in the following, the connection between the structural elements is illustrated as a connection at a point.

In FIG. 1 the areas a, d, n, and k are particularly emphasized by hatching: They form a fan-like arrangement of guiding surfaces (the direction of main flow is H–I). The octahedron delimited by the face centres E, . . . F'—it is a regular octahedron—belongs to the kind having only open side faces. Between the two areas d and n lies an octahedron of the other kind shown only in half (alternately open and closed side faces); the vertices of this half are I,D,G,N and G'.

The drawings, with respect to which the structures according to the invention will now be described, illustrate the special case of face-centred cubic arrangement. However, also the generalisation applies that the unit cell A, . . . N is not cubic but has the shape of any desired parallelepiped, for instance a cuboid, as is shown in FIG. 3 (the edge AB is longer than the edges BC and AK).

FIG. 4 serves partly to illustrate the face-centred cubic lattice and partly to introduce reference signs for the lattice points. A cube-shaped cut-out of the lattice is shown which consists of eight unit cells. The octahedra delimited by the face centres of the unit cells are represented as opaque bodies. To the points are assigned three-figure numbers which, as is apparent, are related to the co-ordinates of the points. The lattice point nearest to the observer has number 111. The point which is situated in the lattice cut-out diametrically to the point 111 and which is not visible has number 555. The centre of the lattice cut-out is covered by the octahedron below the point 122; it has number 333. It is advantageous for the interpretation of FIGS. 5 to 8 if reference is made to FIG. 4 for assistance in orientation.

FIG. 5 shows a cut-out of a lattice plane 3*, given by the large cube with vertices 111 to 555, which passes through the spacial centre 333 and through the midpoints 135, 315 etc of the edges. This hexagonal cutout is divided into 24 equilateral triangles which will be hereinafter called "elementary triangles". The dash-dot line 3a represents the rim of the rectangular widening of the hexagonal cut-out. The first embodiment of the vertex packing according to the invention has a system of parallel base areas which may be described with reference to the lattice plane 3*: The base area 3 is divided according to the lattice plane 3* into elementary triangles which are partly left in the base area 3 and partly are deflected from the base area 3. With every elementary triangle in FIG. 5 is associated a small circle which indicates whether the elementary triangle is deflected forwards (circle with a plus sign), deflected backwards (circle with a minus sign) or remains in the base area 3 (empty circle). For the eight elementary triangles situated in the central field points 20 indicate the vertex which is deflected. FIG. 8 shows the deflection of elementary triangles 9; the arrows 21 indicate the direction of deflection. For instance the vertex at point 441 is deflected forwards to the point 331; or the vertex at point 234 is deflected backwards to the point 335. The elementary triangles 8 remain in the lattice plane 3*.

The base area 4 of the second embodiment (FIG. 6) is pleated, i.e. folded in a zigzag manner. The large cube 11, . . . 555 may be so situated that the one folding edge 11 will lie on the straight line through the points 351 and 315, while the neighbouring folding edges 12 pass through the points 131 and 113 or 531 and 513. For the eight elementary triangles in the rhombus with vertices 333, 315, 513 and 531 is again indicated, analogically to FIG. 5, whether and how the triangles are deflected. FIG. 7 shows the pleated base area 5 of the third embodiment. In view of the descriptions of FIGS. 4 to 6, explanation of FIG. 7 is not necessary.

FIGS. 10 to 12 show, by means of a diagonal section through the large cube 111, . . . 555 the system of base areas; only their position is indicated by dash-and-dot lines. The planar base area 3 of the first embodiment shown in FIG. 5 has the direct neighbours 3' and 3". The same applies analogically to the pleated embodiments with the base areas 4, 4'. 4" (FIG. 11) and 5, 5', 5" (FIG. 12).

FIGS. 13 to 15 show a periodical pattern of the three embodiments. The reference numbers 40 indicate the boundaries of the elementary triangles and the reference numbers 50 the boundaries of the periodically recurring groups (hereinafter "periodic group" for short). The plus and minus signs introduced in FIG. 5 are here, for the sake of simplicity, without the surrounding circles. The arrows 11' and 12' indicate the positions of the folding edges 11 and 12.

During the assembly of the vertex packing, the adjacent base areas are so offset that, for instance, the elementary triangles marked by empty circles will lie shifted by one triangle side to the right or to the left, while the shifting movement must be carried out in the direction of the diagonals between the points 115 and 151. In view of this shifted arrangement, the deflected elementary triangles of the adjacent base areas may be connected in pairs. There is a correspondence between the edges 30 and 31 and a correspondence between the edges 32 and 33; e.g. by the pairing of the edges 30 and 31 a connection between the base areas 3" and 3 may be established (cf. FIG. 10), while by the pairing of edges 32 and 33 connection between the base areas 3 and 3' may be obtained. The same applies analogically for the two other embodiments. There is, naturally, a difference: In the third embodiment two elementary triangles of the same base area (e.g. in FIG. 7 the two triangles with vertices 333, 342 and 432, or 432, 543 and 533) are connected together, per periodic group,.

For the first embodiment (corresponding to FIG. 8) is shown in FIG. 9 a periodic group which may be carried out in practice. The deflectable elementary triangles 9' depart somewhat from the ideal shape which is indicated by the dash-dotted boundary lines 40. Between the cut edges 41 of the triangles 9' and the lines 40 are provided narrow strips 42, which remain in the base area 3 and give it the necessary stability. On the boundary lines 40 lie the folding edges 15 about which are deflected the elementary triangles 9'. Some of the triangles 9' have on the deflected vertex a rectangular formation 91. This formation 91 enables connection or contact with the adjacent base areas 3' and 3" which is linear (not at a point).

FIG. 16 shows the periodic group for a variant of the first embodiment in a practical realisation. Here the elementary triangles 9" differ somewhat less from the ideal triangular shape. The folding edges 15' are drawn with dotted lines. Some of the elementary triangles, namely the triangles 9a, have a lateral strip 43 which is somewhat deflected about the fold edge 16 with respect to the area of the triangle. FIG. 17 represents a cross-section through the base area 3 along the connection line between the points 234 and 423. The base area 3 is at the regions 7 slightly pleated by pairs of folding edges 17a and 17b. The pleating angle 70 is greater than about 145° and the spacing of the pleating edges 17a and 17b has about 10% to 20% of the side length of an elementary triangle 9. The pleating edges delimit strips of linearly arranged elementary triangles 9.

Also composite shapes of the three regular base shapes (according to FIGS. 10, 11 and 12 or claims 5, 6 and 7) may be constructed. It would be possible, in an extreme case, to provide, per layer of the vertex packing, only one folding edge 11 in which case, obviously, all folding edges would lie in a common plane. (claim 4 with only one folding edge corresponds to this extreme case).

The sheet-like material from which the vortex packing according to the invention is made may be of metal or plastics. It may have a surface structuring, e.g. a fine grooving. In addition it may be perforated by holes the diameter of which is substantially smaller than the lengths of the sides of the elementary triangles. The cut edges of the deflectable elementary triangles may be smooth or toothed.

For the connection between the elementary triangles may be used spot welding (laser, microplasma or resistance welding). However, also mechanical means may be used for the connection, e.g. rivets.

The vertex packing according to the invention may heave various uses: use in a column for mass exchange and/or heat exchange between a trickle film and a gas stream, in which case for more regular wetting a horizonal grooving may be made on the structural elements. Also possible is use in a reactor, in which the packing is made as a carrier for a catalyst, or use in a static mixer for fluid media.

I claim:

1. Vortex packing for an apparatus designed as a mass exchange column or a static mixer, the apparatus comprising face-shaped structural elements (a,d,k,n) which define a point lattice whose lattice planes, situated in cross-sections of the apparatus, form base grids of quadrilaterals, each of these quadrilaterals representing an equatorial periphery of an octahedron, the polar vertices of these octahedra being positioned at the points of neighbouring lattice planes, and the octahedra have either all open faces or alternately open and closed faces, characterised in that the packing is built of parallel layers of a sheet-like material having substantially triangular elementary areas (8,9), part of these elementary triangles (9) having each on two sides cut edges (30) and being deflected in a flap-like manner about folding edges (15) out of a base area (3;4;5) and the structural elements of the packing are formed by association or connection of the elementary triangles (8,9) in pairs.

2. Vortex packing according to claim 1, characterised in that the sheet-like material forms a base area (3) of the deflected elementary triangles (9) which substantially coincides with the lattice plane (3*).

3. Vortex packing according to claim 1, characterised in that the base area (3) is slightly pleated as a consequence of pairs of pleating edges (17a,17b), the spacing of the pleating edges amounting to about 10% to 20% of the side length of an elementary triangle (8), the pleating angle (70) being greater than about 145° and the pleating edges delimiting strips of linearly arranged elementary triangles.

4. Vortex packing according to claim 1, characterised in that the sheet-like material forms a base area (4) of the folded out elementary triangles (9), the base area having at least one folding edge (11) through which takes place a change of the base area (4) of one lattice plane, on which the base area is substantially situated, to another lattice plane.

5. Vortex packing according to claim 4, characterised in that the base area (4) comprises a regular zigzag pleating, each of the folding edges (11) delimiting strips which contain two parallel bands with linearly arranged elementary triangles.

6. Vortex packing according to claim 4, characterised in that the base area (5) comprises a regularly zigzag pleating, each of the folding edges (11, 12) delimiting strips of linearly arranged elementary triangles.

7. Vortex packing according to claim 1, characterised in that the sheet-like material is of metal or plastics.

8. Use of a vortex packing according to claim 1 in a mass exchange column or heat exchange column between a trickle film and a gas stream, the structural elements being provided with horizontal grooving to obtain more regular wetting.

9. Use of a vortex packing according to claim 1 in a reactor in which the packing is used as a carrier for a catalyst.

10. Use of a vortex packing according to claim 1 in a static mixer for fluid media.

* * * * *